United States Patent Office 3,594,414
Patented July 20, 1971

3,594,414
PROCESS FOR THE PREPARATION OF FIBER-GRADE TEREPHTHALIC ACID
Ewald Katzschmann, Witten-Bommern, Germany, assignor to Dynamit Nobel Aktiengesellschaft, Troisdorf, Germany
No Drawing. Filed Sept. 1, 1967, Ser. No. 664,948
Claims priority, application Germany, Sept. 3, 1966,
D 51,020
Int. Cl. C07c 63/26
U.S. Cl. 260—515R                       15 Claims

ABSTRACT OF THE DISCLOSURE

A process for the preparation of fiber-pure terephthalic acid which comprises hydrolyzing dimethyl terephthalate at a temperature of from about 180° to 280° C., preferably 200°–250° C. The process is advantageously carried out under pressure in a corrosion-proof vessel with an aqueous solution of a neutral water-soluble inorganic salt, said salt being used in concentrations of about 5 to 50% by weight. The preferred salts employed are sodium chloride, potassium chloride and calcium chloride. The process may be carried out as a continuous process with the obtained terephthalic acid being further purified by subsequent washings or by steam distillation. Leftover filtrates and washings are recycled to the reaction solution for a more efficient operation.

BACKGROUND OF THE INVENTION

This invention relates to a process for the preparation of fiber-grade terephthalic acid. More particularly, it relates to a process for the preparation of terephthalic acid having a very high degree of purity such that it may be used for producing fibers and films. Even more particularly, the invention relates to a process for the preparation of fiber-grade terephthalic acid by the neutral hydrolysis of dimethyl terephthalate.

Terephthalic acid with a very high degree of purity, unusually high for industrial purposes, is required for the preparation of polyesters which are to be used as fiber and film material. Such polyesters are usually made from terephthalic acid and ethylene glycol by direct esterification and subsequent condensation polymerization. At the present time, there are available on the market certain "pure-fiber" grades of terephthalic acid. However, these materials do not possess the attainable optimum of purity and therefore fail to meet many of the specific requirements in the industry.

The removal of all impurities found in a terephthalic acid as a result of its preparatory process is very difficult and has been feasible heretofore only by a combination of purification steps, the reason being the heterogeneous structure and the diverse chemical properties of the impurities. These difficulties have led to the use of dimethyl terephthalate in a transesterification reaction with ethylene glycol for producing polyesters. This is because dimethyl terephthalate (DMT) can be prepared virtually free from all impurities by recrystallization and distillation. Hence, in one embodiment of the present invention, for the production of extremely pure terephthalic acid, it is advantageous to use highly pure DMT and to subject the same to hydrolysis, instead of purifying crude terephthalic acid by way of one of the involved and costly processes. A comparative principle of this aspect of the invention is the basis of U.S. Pat. 2,968,674, wherein extremely pure adipic acid is prepared by the hydrolysis of its ester in the presence of inert gases, in particular, $CO_2$.

Hydrolysis as such as a known reaction and is employed by the chemical industry often and very successfully. One example is the hydrolysis of fats, accomplished basically under pressure at higher temperatures and by the use of suitable catalysts. Such conditions apply to esters which are normally susceptible to hydrolysis. In certain cases, these conditions do not suffice to attain easily a degree of conversion which would be worthwhile with respect to the economics of the situation. These latter considerations are of particular pertinence especially in the case of terephthalic acid esters, all of which can be hydrolyzed only with difficulty. This fact is well known so far as polyethylene terephthalate is concerned. However, dimethyl terephthalate also possesses a great resistance to hydrolysis, a fact demonstrated by French Pat. 1,296,465, which proposes a steam distillation at temperatures near 170° C. as a purification process for DMT. U.S. Pat. 3,120,561 describes the hydrolysis of polyethylene terephthalate at temperatures ranging from 230° to 250° C. As far as the hydrolysis of DMT is concerned, there are only published some tests relating to water-dioxane and water-acetone mixtures.

The application of the various specifications used for hydrolysis reactions, as known from the prior art, to dimethyl terephthalate has led to unsatisfactory results so far as the rate of conversion, purity and crystal form are concerned. The alkaline separation leads to the alkali salt of terephthalic acid, which in turn must react with a mineral acid in order to become free terephthalic acid. The employment of very pure mineral acids is costly, and so is the equipment required for such a process. The acidic separation results in impure terephthalic acid which can be made non-acidic only at great expenditure. Waste water problems arise with both of these processes, thereby making the same more complicated and costly. The neutral conversion, proposed by U.S. Pat. 3,120,561, whereby polyethylene terephthalate is heated with water, results in a low and uneconomical 60% to 65% rate of conversion. This is possibly caused by the fact that the polyethylene terephthalate contains impurities, for example, titanium dioxide, which exert a catalytic effect, while the DMT is absolutely free of such substances.

Accordingly, a hydrolytic process for DMT must meet the following requirements in order to be feasible for industrial and economic use:

(1) Industrially available materials must be employed in the reaction which have inert properties during the reaction relative to the terephthalic acid.

(2) A high, if possible total, rate of conversion must be attained.

(3) If catalysts or additives for the purpose of specific effects are employed, it is necessary that these substances can be separated easily from the free terephthalic acid.

(4) The terephthalic acid must be obtained in the proper crystalline form.

The hydrolysis attempted by the use of 0.25 to 2 moles of dimethyl terephthalate and 200 to 500 cc. of distilled water in a 1 liter titanium shaking autoclave at temperatures ranging from 200° to 250° C., pressures of 30 to 45 atmospheric gauge pressure and reaction times of 1 to 6 hours without catalysts, as well as with the use of catalysts such as zinc or titanium salts, and/or the admixture of solvents such as methanol, acetone, xylene, dioxane, glacial acetic acid and the like, led to unsatisfactory results. The rate of conversion ranged from 60–90% of the theoretical. This yield could be increased only by uneconomically long reaction periods, which also resulted in a deterioration of the quality of the terephthalic acid. Decisive as far as the rejection of the known methods was the fact that the terephthalic acid so obtained showed a titanium-positive reaction which could not be subsequently eliminated. The acid could be filtered with difficulty only because of its excessively fine grain size. Measurements of the transparency of a 7.5% by weight solution of terephthalic acid in 2 N KOH by means of a 50 mm. cell with 380 m$\mu$, or a 20 mm. cell with 340 m$\mu$, respectively, showed values ranging from 70 to 90%, which fell short of the required values.

Accordingly, one of the objects of the present invention is to provide an improved process for the preparation of terephthalic acid which overcomes the disadvantages and deficiencies of the prior art methods.

Another object of the present invention is to provide a process for the preparation of very pure, so-called "faserreiner," terephthalic acid which may be carried out advantageously and efficaciously.

A further object of the invention is to provide pure fiber-grade terephthalic acid.

A still further object of the invention is to provide a process for the preparation of fiber-grade terephthalic acid which may be carried out advantageously on an industrial scale at low cost to give a high yield of product.

These and other objects and advantages of the present invention will become apparent to those skilled in the art from a consideration of the following specification and claims.

SUMMARY OF THE INVENTION

In accordance with the present invention, it has been found that pure fiber-grade terephthalic acid can be produced by hydrolyzing dimethyl terephthalate at temperatures of 180° to 280° C., preferably at 200° to 250° C., under pressure in corrosion-proof vessels. Most preferably, the hydrolysis is carried out in a solution of neutral salts. Particularly suitable salts, among others, are sodium chloride, potassium chloride and calcium chloride. Other additives may be employed therewith, but in conformity with the purity of the DMT such additives must also be of the quality "analytically pure."

Under these conditions, conversion rates of 92–96% of the theoretical are attained, even if the methanol, which is liberated during the reaction process, is not continuously distilled off. If the methanol is removed during the course of the reaction, the process will be quantitative. This method of operation has the primary advantage that the terephthalic acid so produced is obtained titanium-free and in a surprisingly advantageous crystal form which, as noted above, is important with respect to the economics of further processing (such as transporting and handling thereof).

The method proposed by the present invention is accomplished in the following exemplary manner. Fiber-grade DMT, together with a two- to four-fold quantity of a 5–50% by weight neutral salt solution in distilled water, is heated in a titanium autoclave, or in an autoclave made from an equivalent material such as tantalum, with stirring or shaking to temepratures of 180° to 250° C. for periods ranging from one to six hours, preferably two to three hours. The liberated methanol is withdrawn continuously by means of a condenser. The pressure, determined empirically, is approximately 30 to 50 atmospheres gauge pressure. Upon the termination of the reaction, which can be determined by the amount of methanol withdrawn, the reaction substance is cooled to 60–80° C. and then filtered or centrifuged. The filtrate is always returned or recycled as a hydrolysis component, thus replenishing any actual losses of the component.

An alternate execution of the method proposed by the present invention is the hydrolysis without the removal of the methanol by distillation. In this case, the reaction time is determined empirically. The methanol, and then a portion of the water, is removed by distillation upon completion or termination of the reaction. Any existing traces of DMT and terephthalic acid monomethyl ester, which are volatile to water vapor, will become part of the distillate together with the water vapors. It is advantageous to return the thusly removed DMT and monoester, or the entire distillate, to the reaction process.

The terephthalic acid, separated by filtration or centrifuging, will still contain a small amount of neutral salt solution. By separate washing with cold, or preferably hot, water, or by washing in the filter or in the centrifuge, the terephthalic acid is freed of any remaining salt, a step which can be effectively accomplished without difficulty. In order to increase its purity, the slightly aqueous terephthalic acid can also be washed with acetone or with some other water-insoluble solvent of dimethyl terephthalate and monomethyl terephthalate, either in a separate vessel, in the filter or in the centrifuge, respectively. By means of such a treatment, any water as well as any existing traces of DMT and/or terephthalic acid monomethyl ester will be removed. If the extract is freed of the solvent by means of distillation, the distillate will contain approximately 0.1 to 2% by weight (relative to the amount of dimethyl terephthalate employed) of a mixture of DMT, terephthalic acid monomethyl ester and terephthalic acid in a proportion of 1:3:1, which likewise can be returned to the reaction process. The acetone can be used several times for such an after-treatment and in a quantity equal to or up to three times the amount of the terephthalic acid. Such treatment will also greatly facilitate the drying of the terephthalic acid and will eliminate thermal stresses.

The method of present invention is most suitably carried out in batches if a small-scale production is desired. The same holds true by necessity for work carried out in the laboratory. In the case of large volume production, the process may be effectively carried out as a continuous operation. For this purpose, a series of vessels, especially cylindrical vessels with acid being removed at the bottom, or tube systems are suitable. If such an arrangement is used, it is possible to pump liquid DMT continuously into the circulating salt solution and to withdraw the terephthalic acid by way of a Schael centrifuge.

EXAMPLES OF THE INVENTION

Tables I and II, set forth below, list experimental results obtained by the use of known prior art methods and, in comparison thereto, by the method of the present invention. These examples are given merely as illustrative of the present invention and are not to be considered as limiting. Unless otherwise noted, the percentages therein and throughout the application are by weight.

TABLE I

| Expt. No. | DMT (moles) | Water (cc.) | Solvent (grams) | Catalyst (grams) | Neutral salt, analytically pure (grams) | Temperature (° C.) | Reaction time (hrs.) |
|---|---|---|---|---|---|---|---|
| 10 | 0.5 | 500 | | | | 200 | 2 |
| 11 | 0.5 | 500 | | | | 225 | 2 |
| 12 | 0.5 | 500 | | | | 250 | 2 |
| 17 | 0.5 | 500 | | | | 180 | 3 |
| 19 | 1.0 | 100 | 300 g. p-xylene | | | 220 | 3 |
| 20 | 1.0 | 100 | do | | | 250 | 3 |
| 25 | 0.5 | 100 | do | | | 250 | 3 |
| 26 | 0.5 | 300 | 100 g. p-xylene | | | 250 | 3 |
| 29 | 0.5 | 468 | 32 g. methanol | | | 250 | 3 |
| 30 | 0.5 | 436 | 64 g. methanol | | | 250 | 3 |
| 33 | 0.5 | 350 | 50 g. glacial acetic acid | | | 250 | 3 |
| 34 | 0.5 | 400 | | 5 g. KHSO4 | | 250 | 3 |
| 38 | 0.5 | 400 | | | | 250 | 3 |
| 39 | 0.5 | 400 | | | | 250 | 3 |
| 41 | 1.0 | 350 | 75 g. methanol | | | 250 | 3 |
| 42 | 0.5 | 350 | do | | | 250 | 3 |
| 45 | 0.5 | 400 | | | 20 g. KCL | 250 | 3 |
| 46 | 0.5 | 400 | | | 20 g. NaCL | 250 | 3 |
| 47 | 0.5 | 400 | | | 20 g. CaCl$_2$·2H$_2$O | 250 | 3 |
| 50 | 0.5 | 400 | | | 50 g. NaCl | 250 | 3 |
| 53 | 0.5 | 400 | | | 100 g. NaCl | 250 | 3 |
| 59 | 0.5 | 400 | | | 30 g. CaCl$_2$·2H$_2$O | 250 | 3 |
| 60 | 0.5 | 400 | | | 40 g. CaCl$_2$·2H$_2$O | 250 | 3 |
| 61 | 0.5 | 400 | | | 50 g. CaCl$_2$·2H$_2$O | 250 | 3 |
| 62 | 1.0 | 400 | | | 100 g. NaCl | 250 | 6 |
| 65 | 1.0 | 400 | With removal of methanol during the reaction | | 100 g. NaCl | 250 | 6 |

TABLE II

| Expt. No. | Terephthalic acid (percent of theoretical yield) | Titanium content | Transparency in percent (380 mµ/5 cm.) | Transparency in percent (340 mµ/2 cm.) |
|---|---|---|---|---|
| 10 | 21 | + | | |
| 11 | 37 | + | | |
| 12 | 41 | + | | |
| 17 | 11 | + | | |
| 19 | 3.6 | − | 88 | |
| 20 | 11.7 | − | 72 | |
| 25 | 37 | + | 90 | |
| 26 | 71 | − | 96 | |
| 29 | 66 | + | 94 | |
| 30 | 54 | + | 91 | |
| 33 | 76 | + | 94 | |
| 34 | 74 | + | 89 | |
| 38 | 73 | + | 65 | |
| 39 | 74 | + | 88 | |
| 41 | 36 | − | 90 | |
| 42 | 50 | + | 91 | |
| 45 | 78 | − | 97 | |
| 46 | 83 | − | 97 | |
| 47 | 84 | − | 95 | |
| 50 | 87 | − | 98 | |
| 53 | 95 | − | 96 | 96 |
| 59 | 83 | − | 90 | 98 |
| 60 | 93 | − | 99 | 99 |
| 61 | 92 | − | 97 | 97 |
| 62 | 94 | − | 97 | 98 |
| 65 | 97 | − | 98 | 99 |

While sodium chloride, potassium chloride and calcium chloride are the preferred neutral salts to be employed in the preferred mode of hydrolysis of dimethyl terephthalate to form terephthalic acid in accordance with the present invention, it is to be understood that other neutral inorganic salts may also be employed. These include neutral water-soluble inorganic alkali metal salts, neutral water-soluble alkaline earth metal salts and ammonium halide salts. Typical examples thereof which may be employed are the chlorides, sulfates and nitrates of sodium, potassium, barium, calcium, strontium and magnesium. Ammonium chloride and ammonium bromide are also advantageously employed.

The invention being thus described, it will be obvious that the same may be varied in many ways. Such variations are not to be regarded as a departure from the spirit and scope of the invention, and all such modifications are intended to be included within the scope of the following claims.

I claim:

1. A process for the preparation of fiber-grade terephthalic acid which comprises hydrolyzing fiber-grade dimethyl terephthalate in the presence of an aqueous solution of a water-soluble inorganic salt selected from the group consisting of the ammonium halides, the chlorides and nitrates of sodium, potassium, barium, calcium, strontium and magnesium and the sulfates of sodium, potassium, calcium and magnesium at a temperature of from about 180° to 280° C. under pressure in a corrosion-proof vessel.

2. The process of claim 1, wherein the hydrolysis is carried out at a temperature of from 200° to 250° C.

3. The process of claim 1, wherein the resultant terephthalic acid is filtered from the reaction product and the filtrate is returned to the reaction solution.

4. The process of claim 1, wherein the resultant terephthalic acid is washed with water and subsequently with a water-miscible solvent.

5. The process of claim 4, wherein said water-miscible solvent is selected from the group consisting of acetone, dioxane and methanol.

6. The process of claim 4, wherein the solvent-free extracts are returned to the reaction solution.

7. The process of claim 6, wherein the entire process is carried out as a continuous process.

8. The process of claim 1, wherein the resultant tereephthalic acid is subjected to a steam distilaltion in order to purify the same.

9. The process of claim 8, wherein the products of the steam distillation are returned to the reaction solution.

10. The process of claim 1, wherein the hydrolysis is carried out as a continuous process.

11. The process of claim 1, wherein the methanol liberated during the hydrolysis is withdrawn continuously as soon as possible from the reaction solution.

12. The process of claim 1, wherein said inorganic salt is employed in a concentration of about 5 to 50% by weight.

13. A process for the preparation of fiber-grade terephthalic acid which comprises hydrolyzing fiber-grade dimethyl terephthalate in the presence of an aqueous solution of an inorganic salt selected from the group consisting of sodium chloride, potassium chloride and calcium chloride at a temperature of from about 180° to 280° C. under pressure in a corrosion-proof vessel.

14. A process for the preparation of fiber-grade terephthalic acid which comprises hydrolyzing fiber-grade dimethylterephthaliate in the presence of an aqueous solution of an inorganic salt selected from the group consisting of sodium chloride, potassium chloride and calcium chloride at a temperature of from about 200° to 250° C. under pressure in a corrosion-proof vessel.

15. The process of claim 14, wherein said inorganic salt is employed in a concentration of about 5 to 50% by weight.

References Cited

UNITED STATES PATENTS 3,120,561  2/1964  Chambret _____ 260—515

FOREIGN PATENTS 611,032  12/1960  Canada _____ 260—515

OTHER REFERENCES

Migridichian Organic Synthesis, Reinhold, New York (1957), pages 328–9.

JAMES A. PATTEN, Primary Examiner

V. GARNER, Assistant Examiner